C. BEALE & D. P. MOORE.
HYDRAULICALLY OPERATED PUMPING MECHANISM.
APPLICATION FILED OCT. 21, 1908.
932,240.
Patented Aug. 24, 1909.
5 SHEETS—SHEET 1.
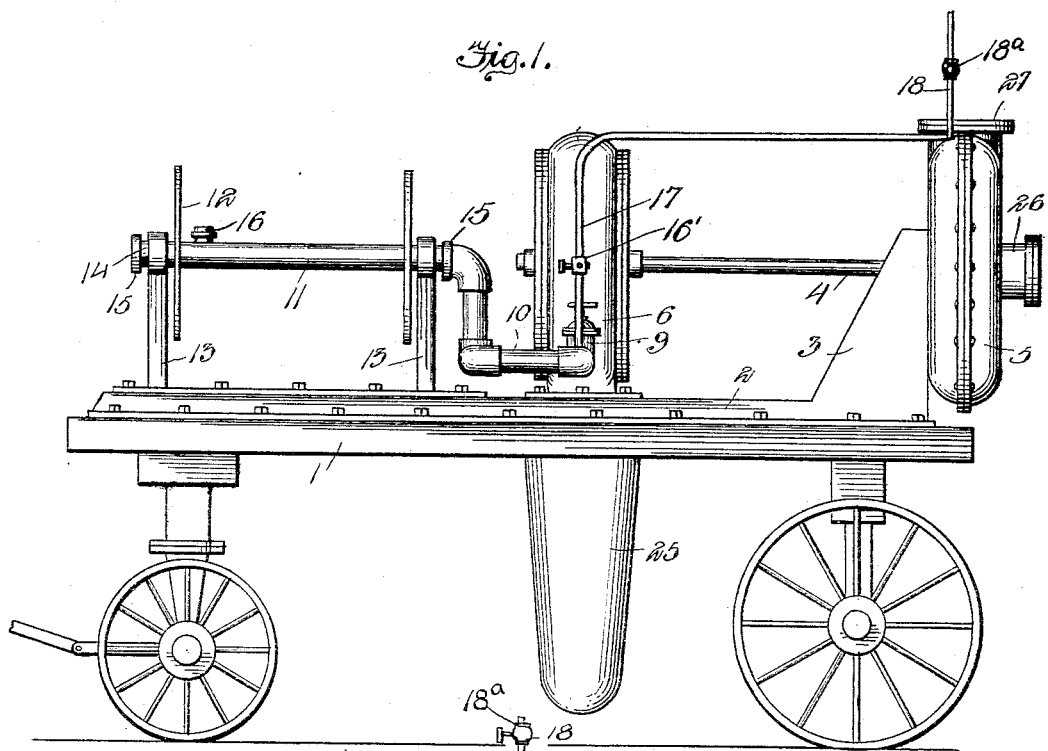

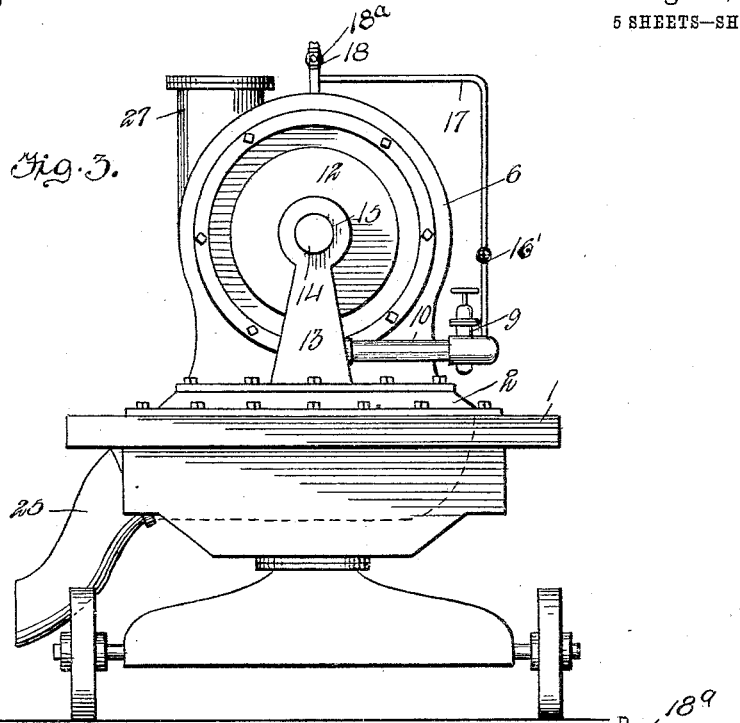
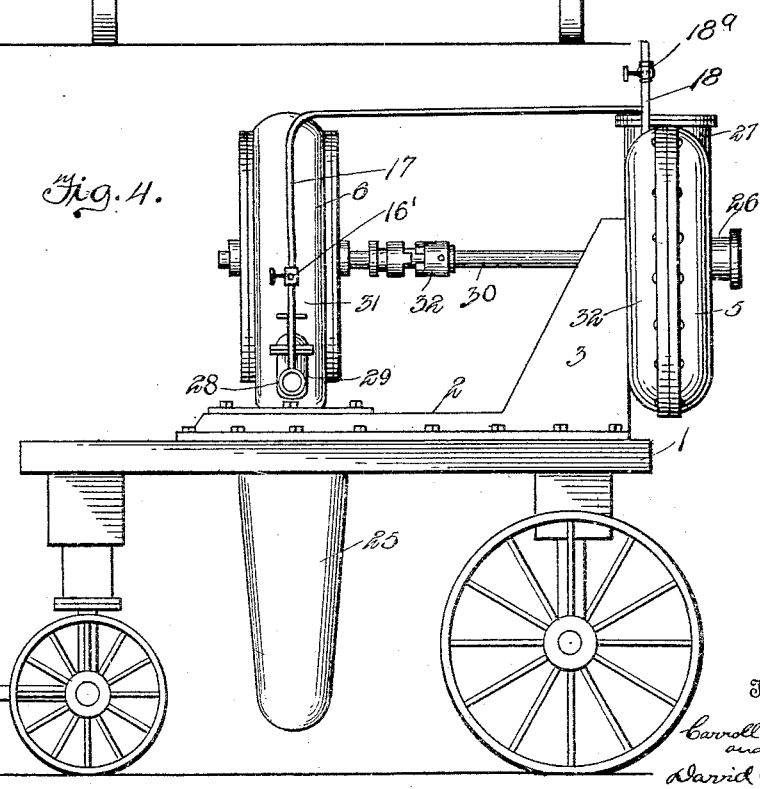

C. BEALE & D. P. MOORE.
HYDRAULICALLY OPERATED PUMPING MECHANISM.
APPLICATION FILED OCT. 21, 1908.
932,240.
Patented Aug. 24, 1909.
5 SHEETS—SHEET 3.
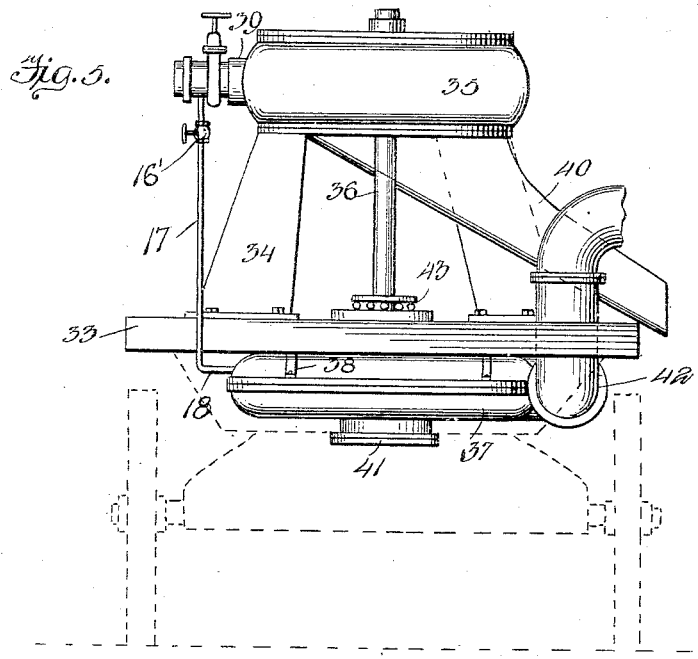
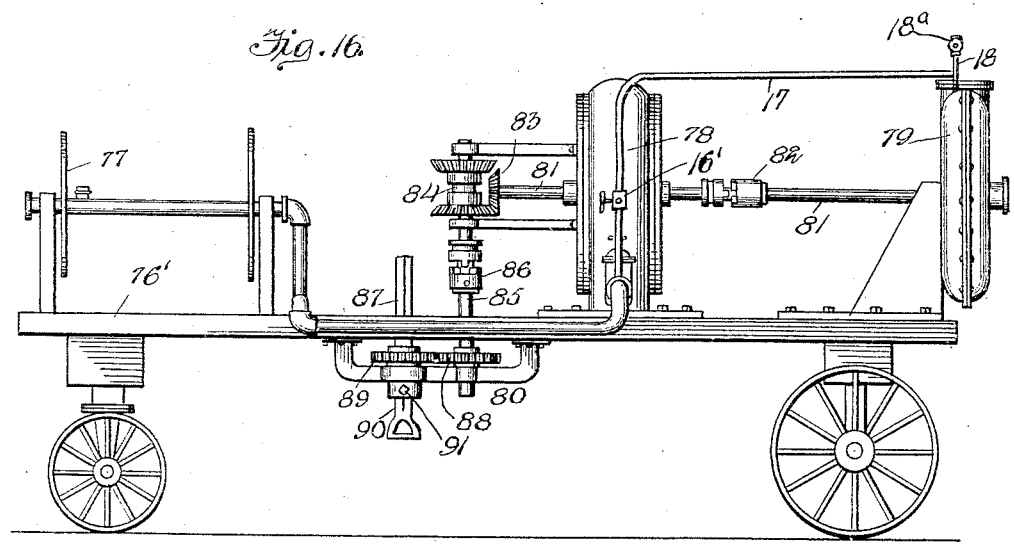

C. BEALE & D. P. MOORE.
HYDRAULICALLY OPERATED PUMPING MECHANISM.
APPLICATION FILED OCT. 21, 1908.
932,240.
Patented Aug. 24, 1909.
5 SHEETS—SHEET 4.
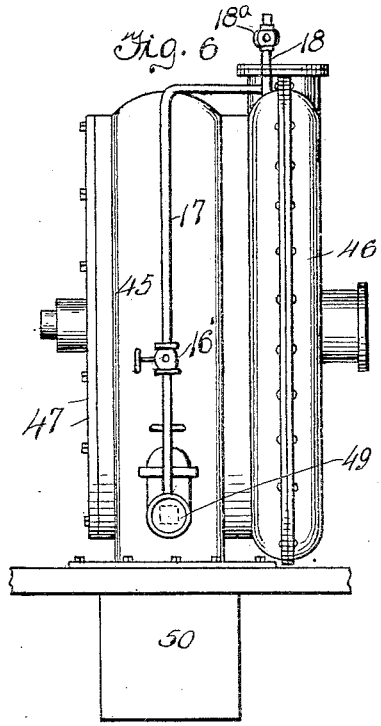
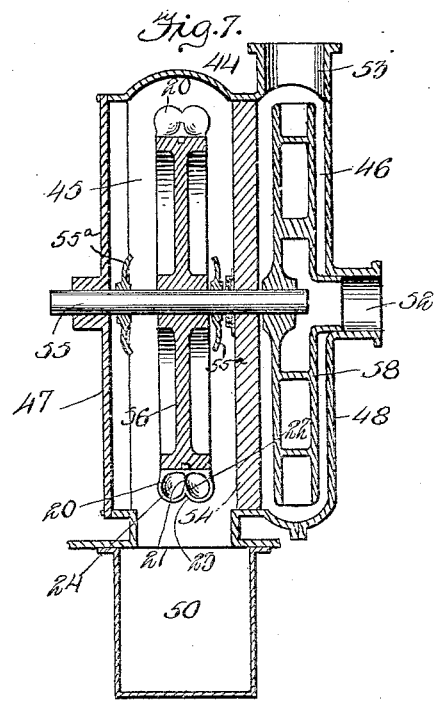
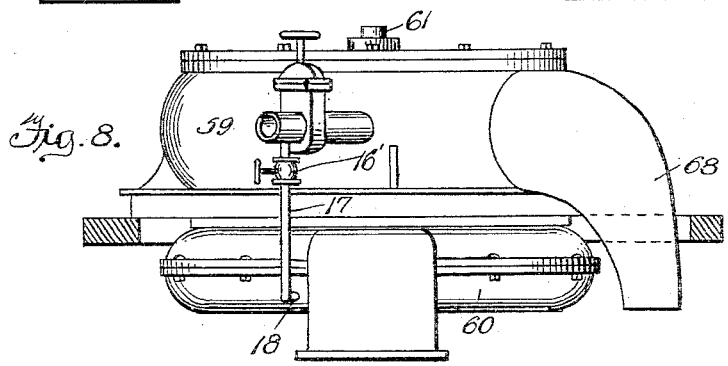
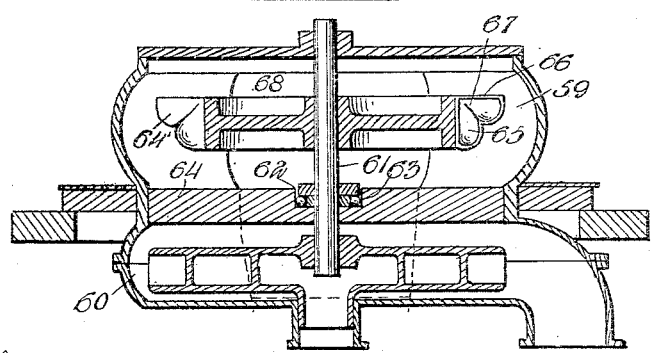

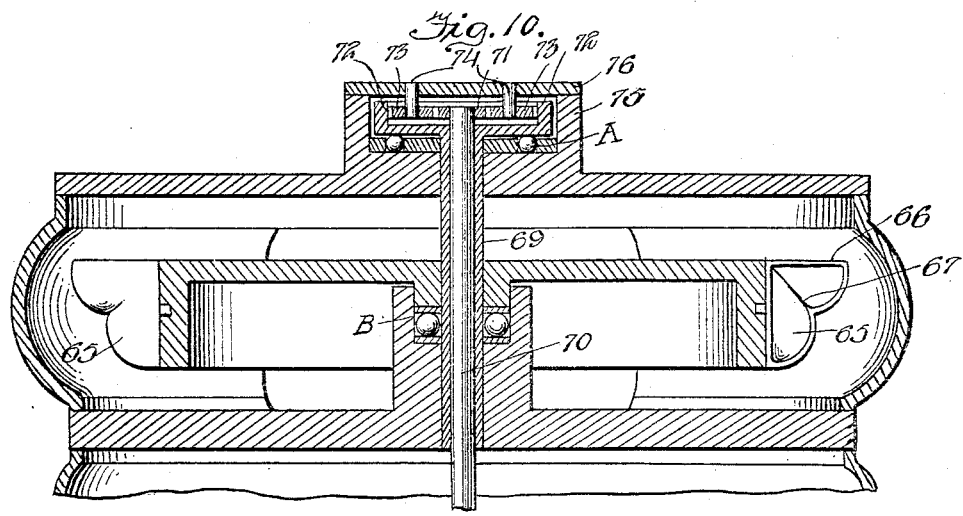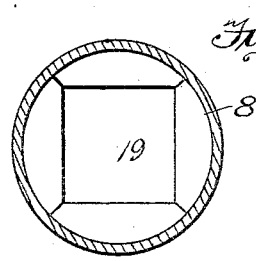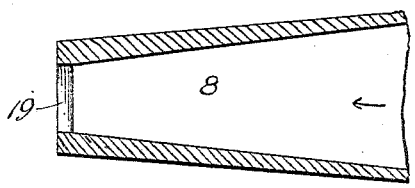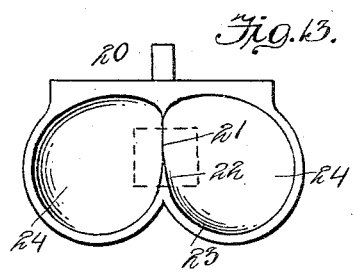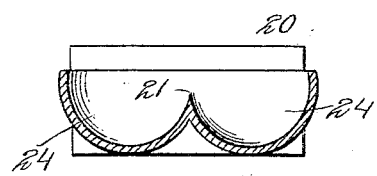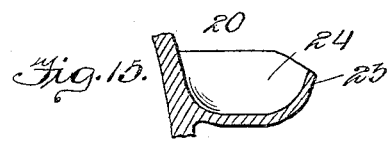

UNITED STATES PATENT OFFICE.

CARROLL BEALE AND DAVID P. MOORE, OF WASHINGTON, DISTRICT OF COLUMBIA, ASSIGNORS OF ONE-THIRD TO EDWIN A. LERCH, OF BALTIMORE, MARYLAND.

HYDRAULICALLY-OPERATED PUMPING MECHANISM.

932,240. Specification of Letters Patent. Patented Aug. 24, 1909.

Application filed October 21, 1908. Serial No. 458,775.

*To all whom it may concern:*

Be it known that we, CARROLL BEALE and DAVID P. MOORE, citizens of the United States, residing at Washington, in the District of Columbia, have invented certain new and useful Improvements in Hydraulically-Operated Pumping Mechanism, of which the following is a specification, reference being had therein to the accompanying drawing.

This invention relates to improvements in hydraulically operated pump mechanisms, and has for its object the provision of a compact apparatus, especially adapted to pumping out vaults, cellars, trenches and foundations, the pumping mechanism being operated entirely through the medium of a rotary water motor. Heretofore steam boilers and engines, electric motors or the more uncertain explosive engine has been the motive power for these pumping mechanisms, which more usually consist of a centrifugal pump. The objection to the steam boiler and engine resides in the fact of the size and the cumbersome manner in which it must be carried from place to place; the electric motor on account of securing the current, and the explosive engine on account of its unreliability. We have therefore endeavored to produce a pumping mechanism, which is easily and quickly transported, and which simply necessitates the connection with the fire hydrants and plugs, which are common in all the cities having water supplies, thus producing a mechanism which is fool-proof and which can be satisfactorily operated in any condition of weather, rainy, warm or freezing. We have also found by experiments, that by combining a rotary water motor having a valved nozzle, with a centrifugal pump, and connecting a valved priming pipe exterior of the valve of the nozzle and to the pump, that we secure water direct from the water source to prime the pump, this water thus supplied, filling the pump casing, and its induction and eduction pipe. By doing this, water is caused to flow from the priming pipe through the eduction of the pump, causing a suction in the induction pipe and casing, whereby such suction materially assists in establishing the effective operation of the pump, during and after the water motor is operated. By this arrangement, there is no direct load placed upon the water motor at the start, but just as soon as it has picked-up its load, the priming pipe is cut-off.

To more clearly illustrate our invention, attention is invited to the accompanying drawings, in which:—

Figure 1 is a side elevation of a truck having our invention mounted thereon. Fig. 2 is a rear end view thereof. Fig. 3 is a front end view thereof. Fig. 4 is a side elevation of an apparatus, dispensing with the hose reel. Fig. 5 is a side elevation of a vertical form of apparatus. Fig. 6 is a side elevation of a combined water motor and centrifugal pump, vertical style. Fig. 7 is a vertical section thereof. Fig. 8 is a side elevation of a combined water motor and centrifugal pump, horizontal style. Fig. 9 is a vertical section thereof. Fig. 10 is a sectional view of the combined form showing a form of gearing for increasing the velocity of the pump. Figs. 11 and 12 are sectional view of a new form of nozzle used in connection with our motor. Figs. 13, 14 and 15 are detail views of a new form of bucket or paddle used upon our water wheel. Fig. 16 is a side elevation of a "leak outfit".

Referring to the drawings:—the numeral 1 designates the platform of a truck, which is adapted to be transported from place to place, as occasion may arise and where the apparatus is to be operated. Mounted upon this platform is a base 2, which at the rear end is provided with the bearing standard 3, in which is journaled the shaft 4, and to which is connected the centrifugal pump casing 5. Mounted also upon the base is the water motor casing 6, whose wheel 7, is mounted upon the shaft 4, the casing 6, forming the other bearing for the shaft. The water motor is provided with a nozzle 8, controlled by the valve 9, and has connected therewith a supply pipe 10, leading from the hollow spindle 11 of the hose reel 12, which is mounted upon the base through the medium of its standards 13. This spindle is sealed at 14 and is provided with a swivel stuffing box 15, so that any amount of hose may be carried upon the reel, and water may be supplied through the hose, the hose connection 16 and the spindle to the water motor without the necessity of unreeling the hose. The amount of hose unreeled, depends entirely upon the distance of the hydrant from the apparatus. It will thus be seen that water is admitted through the hose and reel to the valve controlled nozzle of the water motor. Before, however, the water is admitted to the motor, the centrifugal pump is primed, by opening the valve 16', which allows the water to pass through the pipe 17 to the priming pipe 18, which we may or may not extend upward, but where we do extend it upward, we provide the valve 18ª, whereby the upper end of the pipe 18 may be opened to blow out the pipe or closed, when the pump is being operated. After the priming pipe has been charged, the valve of the nozzle is opened and water is admitted to the motor casing, where the square stream formed by the square jet 19 of the nozzle, as shown in Figs. 11 and 12, is projected upon the buckets 20, detachably secured upon the periphery of the water wheel. These paddles or buckets are each provided with the central ridge or wall 21, which dips at its forward edge as at 22, and with the forward walls 23 of the pockets 24, forms an inverted V-shaped recess. By this means the square stream is split evenly by the ridge, and the bottom and walls of the pockets, as shown in Fig. 13, deflect the streams at various angles away from the wheel and the next succeeding buckets, thus preventing the deflected water from impeding the wheel. As the wheel turns the bucket acted upon passes farther away from the stream, the stream will still act upon the receding bucket through the inverted V-shaped recess until, the stream strikes the next succeeding bucket squarely. When the water has acted upon the bucket, it discharges through the detachable discharge spout 25. The centrifugal pump is provided with detachable induction and eduction pipes which are connected when in use to the central induction port 26 and the outer eduction port 27.

We have found by experiments, that in operating our pumping machine, that the positioning of the priming pipes 17 and 18, is of the utmost importance, it having demonstrated itself that it increases the efficiency of the machine, in that by proper manipulation, the starting load both upon the water motor and pump is relieved, and the water motor is allowed to pick-up its load, while the water is flowing into the casing through the priming pipes, which flowing fills the induction pipe and casing of the pump, and flows out of the eduction or discharge of the pump. This action of the water causes a suction in the induction pipe and casing and assists in establishing the effective operation of the pump, during and after the water motor is started.

To operate the mechanism properly:—
First, the valve 16', is opened, the water from the main having been previously turned on. This causes water to flow into the centrifugal pump casing and its induction pipe, filling both and finally flowing out of the eduction or discharge pipe of the pump, this action causing a suction in the pump and induction pipe and assisting in establishing the effective operation of the pump, during and after the water motor is started. Second, the water motor is now started by turning on the valve 9, thus causing water to operate the motor, which in turn revolves the pump; and as the water from the priming pipes is still running out of the eduction pipe of the pump, the suction created thereby, reduces the load thrown upon the water motor, so that the water motor proceeds and takes up the load of operating the pump. Third, when the eduction stream is normal, the valve 16' is closed, and no water from the water motor supply, flows into the pump. Should the action of the motor increase, indicating that the centrifugal pump was slightly closing its suction, the priming device is again brought into play, without stopping the water motor.

In the form of apparatus shown in Fig. 4, we dispense with the hose reel, and connect a hose directly with the hose connection 28, carried by the valve controlled nozzle 29. The shaft 30 between the motor 31 and pump 32, is provided with a clutch, although this may be dispensed with. This is shown for the reason that in many cases, it will be better to start the water motor, and then use the momentum to start the pump and get up speed thereon.

In Fig. 5, we have shown a platform 33, having mounted thereon the support 34 for a horizontal water motor 35, whose shaft 36, passes downwardly and carries the motor of the centrifugal pump 37, which is mounted below the platform by means of the arms or lugs 38. In this instance the nozzle 39 conducts the water to the motor and is discharged through the discharge spout 40, the water acting upon the motor to revolve the shaft and operate the pump, whose induction port 41 forms an entrance for the water to be pumped, while the water is exhausted through the vertical eduction port 42. In order to reduce the friction upon the vertical shaft, and also to prevent any weight from falling upon the pump by means of the vertical thrust, we provide the ball bearing thrust 43.

In Figs. 6 and 7, we deviate from the usual forms of water motor and centrifugal pump, and combine the motor and pump in substantially one casing 44, which consists of the central member having the water motor chamber 45 and the centrifugal pump chamber 46, the disk cover 47 being for the water motor chamber, while the peculiarly shaped cover 48 is for the pump chamber. The water motor casing is provided with the inlet nozzle 49 and the discharge 50, while the pump chamber is provided with the centrally arranged induction port 52 and the exhaust or eduction port 53. Passing through the motor chamber and journaled in the cover and partition wall 54 is a shaft 55, upon which is mounted within the water motor chamber, the water wheel 56, while carried upon the extreme inner end 57 of the shaft and within the pump chamber is pump motor wheel 58. Thus it will be seen that as the water wheel rotates the centrifugal pump is also operated. The deflecting disks 55ª, prevent water creeping on shaft and affecting bearings. This combined form is what we term a combined water motor and centrifugal pump, vertical type.

In Figs. 8 and 9, we illustrate what we term a combined water motor and centrifugal pump, horizontal type, and in this form the water motor casing 59 and the centrifugal pump casing 60 with their respective wheels are arranged one above the other and horizontally parallel instead of vertical, as in Figs. 6 and 7. The shaft 61 in this case is vertical, and is antifrictionally supported on the ball bearings 62, which as shown are mounted in the central socket 63, formed in the partition wall 64. In this form of water motor the water wheel 64, is provided with the detachable buckets 65, which are each provided with the upper rim 66, which prevents the water as it strikes the bucket from being deflected above the wheel, while the division wall 67, splits the stream and deflects the same outwardly toward the discharge 68, and away from the next succeeding bucket. This form of bucket is slightly different from the buckets 20, which are adapted for use upon vertical wheels, while the buckets 65 are designed especially for horizontal wheels.

Where it is desired to increase the velocity of the centrifugal pump, we use the form shown in Fig. 10, wherein the vertical shaft 69 is hollow, and is antifrictionally supported at A and B, to carry the weight of the two wheels, the lower wheel being carried upon the small vertical shaft 70, which is mounted within the hollow shaft and extends above and below the same. Upon its lower end is carried the centrifugal pump wheel, while upon its upper end is mounted the small gear 71, which receives motion from the large internal gear 72, through the medium of the several small gears 73, which are held relatively to each other by means of the studs 74 and cover 76. The internal gear is carried upon the upper end of the shaft 69, and is rotatably mounted upon the ball bearings A, within the casing 75, formed upon the cover of the water motor casing, a cover 76, being provided for the casing 75.

In Fig. 16, we have illustrated a combined pumping and valve operating mechanism, or what would commonly be termed a "leak outfit", that is a complete outfit for pumping out vaults and closing gate valves. This consists of the truck 76', upon which is mounted the hose reel 77, the rotary water motor 78, the centrifugal pump 79, and the valve operating mechanism 80. The horizontal shaft 81 extends upon opposite sides of the water motor and is permanently connected or connected through the clutch 82 to the centrifugal pump, while upon the other end is carried the bevel gear 83, which is adapted to mesh with either gear of the gear clutch 84, to transmit motion in either direction to the shaft 85. Upon this shaft 85 is carried a clutch 86, whereby motion is transmitted from the shaft 85 to the shaft 87, whose gear 88 meshes with the gear 89, which is provided with a rectangular bore for the sliding reception of the squared valve key engaging shaft 90, which is held at the desired adjustment by means of the setscrews 91. By this construction, it will be seen that a complete leak outfit is provided for water departments, and that all that is necessary to do, is to connect the hose to a fire hydrant, and should the vault, in which the gate valve is located, be flooded, the pump is operated to empty the same. When this is done the valve key engaging shaft 90 is connected to the key-shaft of the valve, and by the use of the gear clutch and the other clutch, the valve is either closed or opened, as desired.

What we claim, as new, is:—

1. In an apparatus of this character, the combination of a support, a centrifugal pump mounted thereon, a rotary water motor operably connected with said centrifugal pump, a valve controlled water supply for said motor, and a valved pipe connected to the supply exterior of the valve and also connected to the pump, whereby the pump is primed through the medium of said valved pipe, the flow of water therethrough filling the pump and causing a suction therein to assist in establishing the effective operation of the pump during and after the water motor is started.

2. In an apparatus of this character, the combination of a support, a centrifugal pump mounted thereon, a rotary water motor mounted thereon and operably connected with the pump, and a hose reel mounted upon the base and having a water supply therethrough and to the water motor.

3. In an apparatus of this character, the combination of a support, a hose reel mounted thereon, a water motor having its induction connected through said reel, and a centrifugal pump operably connected with the water motor.

4. In an apparatus of this character, the combination of a base, a hose reel mounted thereon, a water motor having its induction connected through the reel, a centrifugal pump operably connected with the water motor, and a gate valve operating mechanism operably connected to said water motor.

5. In an apparatus of this character, the combination of a portable base, a centrifugal pump mounted thereon, a rotary water motor also mounted thereon, means for operably connecting the motor and pump, a valved nozzle for the motor, and a priming pipe having a valve connected to the nozzle exterior of the nozzle's valve and to the upper portion of the pump casing.

In testimony whereof we affix our signatures in presence of two witnesses.

CARROLL BEALE.
DAVID P. MOORE.

Witnesses:
G. M. SPRING,
H. P. HOWARD, Jr.